(12) United States Patent
Bauer et al.

(10) Patent No.: US 11,332,550 B2
(45) Date of Patent: May 17, 2022

(54) DEVICE AND METHOD FOR PRODUCING POWDERED POLYMERS

(71) Applicant: BASF SE, Ludwigshafen (DE)

(72) Inventors: Stephan Bauer, Ludwigshafen (DE); Markus Toennessen, Ludwigshafen (DE); Christophe Bauduin, Ludwigshafen (DE); Katrin Baumann, Ludwigshafen (DE); Marco Krüger, Mannheim (DE); Andreas Daiss, Ludwigshafen (DE); Markus Muehl, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 311 days.

(21) Appl. No.: 16/488,659

(22) PCT Filed: Feb. 26, 2018

(86) PCT No.: PCT/EP2018/054657
§ 371 (c)(1),
(2) Date: Aug. 26, 2019

(87) PCT Pub. No.: WO2018/158191
PCT Pub. Date: Sep. 7, 2018

(65) Prior Publication Data
US 2020/0231711 A1    Jul. 23, 2020

(30) Foreign Application Priority Data
Mar. 1, 2017   (EP) ..................................... 17158657

(51) Int. Cl.
*B01J 8/24* (2006.01)
*B01J 19/00* (2006.01)
(Continued)

(52) U.S. Cl.
CPC .................. *C08F 2/01* (2013.01); *B01J 8/24* (2013.01); *B01J 19/006* (2013.01);
(Continued)

(58) Field of Classification Search
CPC ... C08F 2/01; C08F 220/14; B01J 8/24; B01J 19/006; B01J 19/1806; B01J 19/2405;
(Continued)

(56) References Cited

U.S. PATENT DOCUMENTS

| 7,994,266 B2 | 8/2011 | Ducker et al. |
| 8,013,087 B2 | 9/2011 | Losch et al. |

(Continued)

FOREIGN PATENT DOCUMENTS

| CN | 105916527 A | 8/2016 |
| EP | 2473536 A1 | 7/2012 |

(Continued)

OTHER PUBLICATIONS

International Application No. PCT/EP2018/054657, International Search Report, dated May 22, 2018.

*Primary Examiner* — Huy Tram Nguyen
(74) *Attorney, Agent, or Firm* — Marshall, Gerstein & Borun LLP

(57) ABSTRACT

An apparatus for production of pulverulent polymers having a reactor for droplet polymerization with an apparatus for dropletization of a monomer solution for the preparation of the polymer. The apparatus for dropletization has holes through which the monomer solution is introduced, an addition point for a gas above the apparatus for dropletization, at least one gas withdrawal point at the periphery of the reactor and a fluidized bed, wherein at least one of the following is fulfilled:
an apparatus for increasing turbulence in the gas flow is disposed in the region of the apparatus for dropletization of the monomer solution, (Continued)

Figure 1:
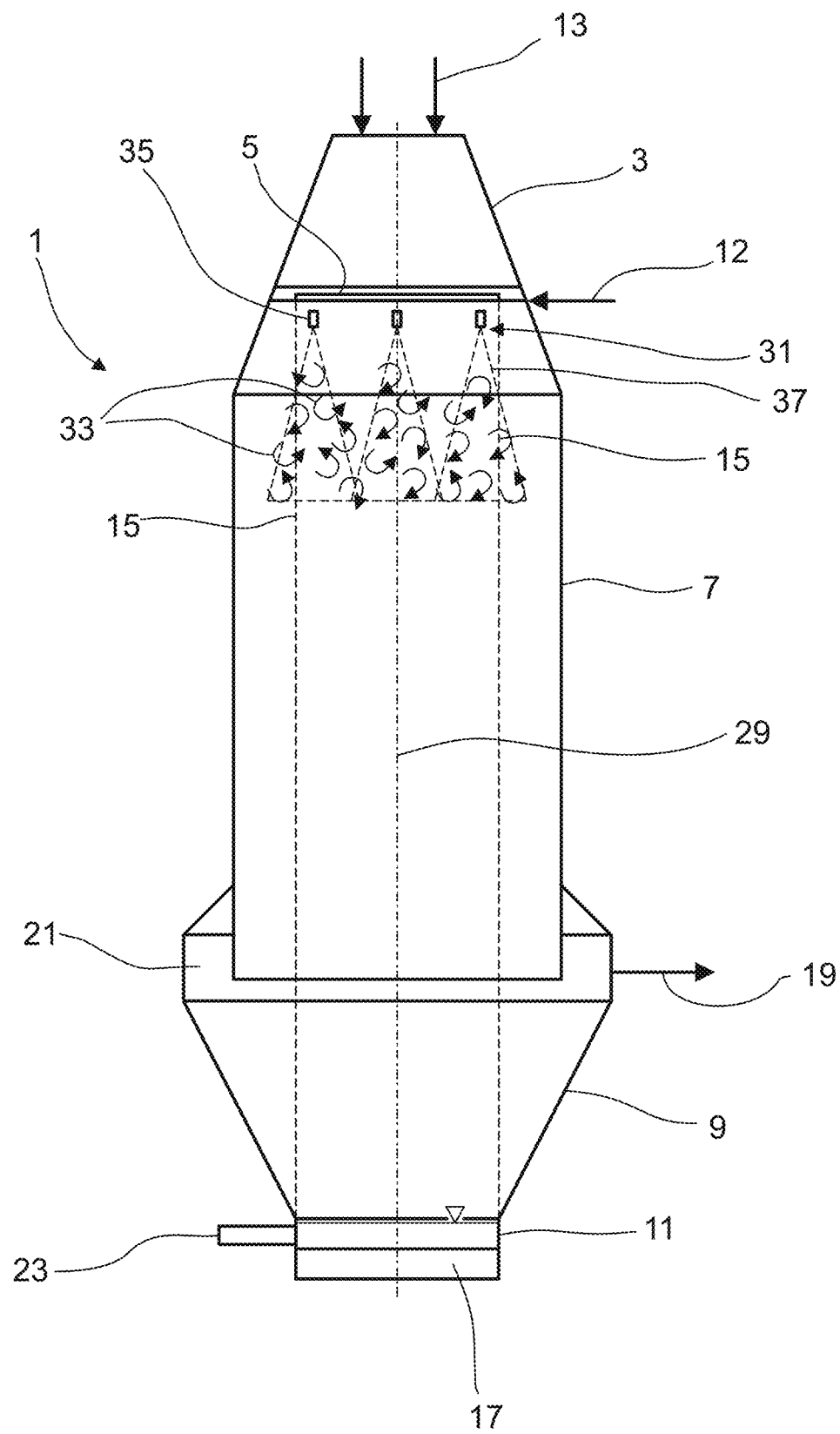

an apparatus for increasing turbulence in the gas flow is disposed in the region of the addition point for the gas, the addition point for gas is configured such that elevated turbulence is generated.

A process for producing pulverulent polymers, in which an increase in flow turbulence in the gas flow in the region of the apparatus for dropletization also is disclosed.

17 Claims, 7 Drawing Sheets

(51) Int. Cl.

| | |
|---|---|
| *B01J 19/18* | (2006.01) |
| *B01J 19/24* | (2006.01) |
| *C08F 2/01* | (2006.01) |
| *C08F 220/14* | (2006.01) |

(52) U.S. Cl.
CPC ....... *B01J 19/1806* (2013.01); *B01J 19/2405* (2013.01); *C08F 220/14* (2013.01); *B01J 2208/0092* (2013.01); *B01J 2219/185* (2013.01); *B01J 2219/1943* (2013.01)

(58) Field of Classification Search
CPC .......... B01J 2208/0092; B01J 2219/185; B01J 2219/1943; B01J 2/04; B01J 2208/00893
USPC ............................................................ 526/88
See application file for complete search history.

(56) References Cited

U.S. PATENT DOCUMENTS

| | | | | |
|---|---|---|---|---|
| 8,114,302 | B2 | 2/2012 | Lee et al. | |
| 8,546,498 | B2 | 10/2013 | Kruger et al. | |
| 10,252,238 | B2 | 4/2019 | Bayer et al. | |
| 10,335,756 | B2 | 7/2019 | Bayer et al. | |
| 2008/0188586 | A1 | 8/2008 | Bruhns et al. | |
| 2008/0272508 | A1 | 11/2008 | Culbert et al. | |
| 2011/0238026 | A1* | 9/2011 | Zhang .................. | A61F 13/534<br>604/372 |
| 2016/0332140 | A1 | 11/2016 | Bauer et al. | |
| 2017/0232418 | A1 | 8/2017 | Daiss et al. | |
| 2017/0246607 | A1 | 8/2017 | Daiss et al. | |
| 2018/0028999 | A1 | 2/2018 | Bayer et al. | |
| 2018/0319906 | A1 | 11/2018 | Kruger et al. | |
| 2018/0326392 | A1 | 11/2018 | Kruger et al. | |

FOREIGN PATENT DOCUMENTS

| | | | |
|---|---|---|---|
| RU | 2141871 | C1 | 11/1999 |
| WO | WO-91/04776 | A1 | 4/1991 |
| WO | WO-2006/079631 | A1 | 8/2006 |
| WO | WO-2007/031441 | A2 | 3/2007 |
| WO | WO-2008/040715 | A2 | 4/2008 |
| WO | WO-2008/086976 | A1 | 7/2008 |
| WO | WO-2010/003855 | A2 | 1/2010 |
| WO | WO-2011/026876 | A1 | 3/2011 |
| WO | WO-2015/197359 | A1 | 12/2015 |
| WO | WO-2015/197571 | A1 | 12/2015 |
| WO | WO-2016/169909 | A1 | 10/2016 |
| WO | WO-2016/207444 | A1 | 12/2016 |
| WO | WO-2018/141677 | A1 | 8/2018 |
| WO | WO-2018/149783 | A1 | 8/2018 |
| WO | WO-2018/158191 | A1 | 9/2018 |

* cited by examiner

DEVICE AND METHOD FOR PRODUCING POWDERED POLYMERS

CROSS-REFERENCE TO RELATED APPLICATIONS

This application is the U.S. National Stage application of International Patent Application No. PCT/EP2018/054657, filed Feb. 26, 2018, which claims the benefit of European Patent Application No. 17158657.1, filed Mar. 1, 2017.

The invention proceeds from an apparatus for production of pulverulent polymers, comprising a reactor for droplet polymerization having an apparatus for dropletization of a monomer solution for the production of the polymer, having holes through which the monomer solution is introduced, an addition point for a gas above the apparatus for dropletization, at least one gas withdrawal point on the periphery of the reactor and a fluidized bed. The invention further provides a process for producing pulverulent polymers in such an apparatus.

The apparatus used and the process are suitable, for example, for production of water-absorbing polymers, especially poly(meth)acrylates, which are used in the production of diapers, tampons, sanitary napkins and other hygiene articles, or else as water-retaining agents in market gardening.

The properties of the water-absorbing polymers may be adjusted via the degree of crosslinking. As the level of crosslinking increases, gel strength increases and absorption capacity decreases. This means that as absorption under pressure increases, centrifuge retention capacity decreases while at very high levels of crosslinking, absorption under pressure also decreases again.

To improve the performance properties, for example liquid conductivity in the diaper and absorption under pressure, water-absorbing polymer particles are generally postcrosslinked. This increases only the level of crosslinking at the particle surface, which makes it possible to decouple absorption under pressure and centrifuge retention capacity at least to an extent. This postcrosslinking can be performed in an aqueous gel phase. Generally, however, ground and sieved polymer particles are surface coated with a postcrosslinker, thermally postcrosslinked and dried. Crosslinkers suitable for this purpose are compounds comprising at least two groups which can form covalent bonds with the carboxylate groups of the hydrophilic polymer.

Different processes are known for production of the water-absorbing polymer particles. For instance, the monomers and any additives used for producing poly(meth)acrylates may be added to a mixing kneader in which the monomers react to afford the polymer. Rotating shafts with kneading bars in the mixing kneader break up into chunks the polymer being formed. The polymer withdrawn from the kneader is dried and ground and sent to further processing. In an alternative version the monomer is introduced into a reactor for droplet polymerization as a monomer solution which may also comprise further additives. The monomer solution breaks up into droplets upon introduction into the reactor. The mechanism of droplet formation may be turbulent or laminar jet breakup, or else dropletization. The mechanism of droplet formation depends on the entry conditions and the properties of the monomer solution. The droplets fall downward in the reactor, in the course of which the monomer reacts to afford the polymer. In the lower region of the reactor there is a fluidized bed into which the polymer particles being formed from the droplets by the reaction fall. A postreaction then takes place in the fluidized bed. Such processes are described, for example, in WO-A 2006/079631, WO-A 2008/086976, WO-A 2007/031441, WO-A 2008/040715, WO-A 2010/003855 and WO-A 2011/026876.

A reactor for droplet polymerization with different apparatuses for introduction of the monomer solution is described, for example, in WO-A 2015/197571 or WO-A 2015/197359.

In the known reactors, because of the flow conditions, the droplet concentrations and gas temperatures can be subject to variations over the reactor cross section. These variations lead to incomplete exploitation of the gas used for drying. As a result, the monomer solution in the individual droplets reacts at different rates to give the polymer.

It is therefore an object of the present invention to provide an apparatus and a process for producing pulverulent polymers, in which improved mixing of the drying gas and of the monomer solution introduced in droplet form is ensured and, in addition, the droplets are distributed more homogeneously over the reactor cross section.

The object is achieved by an apparatus for production of pulverulent polymers, comprising a reactor for droplet polymerization with an apparatus for dropletization of a monomer solution for the preparation of the polymer, said apparatus for dropletization(s) having holes through which the monomer solution is introduced, an addition point for a gas above the apparatus for dropletization, at least one gas withdrawal point at the periphery of the reactor and a fluidized bed, wherein at least one of the following features is fulfilled:

- an apparatus for increasing turbulence in the gas flow is disposed in the region of the apparatus for dropletization of the monomer solution,
- an apparatus for increasing turbulence in the gas flow is disposed in the region of the addition point for the gas,
- the addition point for gas is configured such that elevated turbulence is generated.

The object is additionally achieved by a process for producing polymers in such an apparatus, comprising the following steps:

(a) dropletizing a monomer solution in the apparatus for dropletization, wherein the monomer droplets produced fall through the reactor and the monomer reacts at least partly to give the polymer, so as to form particles, (b) supplying gas via the addition point for gas above the apparatus for dropletization, so as to produce a gas flow from the top downward in the reactor, (c) collecting the particles produced in step (a) in the fluidized bed, wherein the reaction to give the polymer in the individual particles is concluded and there is optionally postcrosslinking in the fluidized bed, (d) withdrawing the particles from the fluidized bed, wherein there is an increase in flow turbulence in the gas flow in the region of the apparatus for dropletization.

In the description which follows, the gas flow generated from the top downward in the reactor is also referred to as drying gas flow, and the gas supplied via the addition point for gas is also referred to as drying gas.

The increase in the flow turbulence which is achieved in the gas flow through the use of the apparatus for increasing turbulence or by virtue of the configuration of the addition point for gas achieves an improvement in mixing, compared to the known reactors, of the drying gas which is added via the addition point for gas with the droplets of the monomer solution. The good mixing results in better exploitation of the drying gas, such that the drying gas can be added at a lower gas inlet temperature. The lower gas inlet temperature reduces the energy requirement for heating of the gas, such that less energy is required overall for production of the polymer than in the case of use of the known reactors.

Depending on the configuration of the apparatus for dropletization of the monomer solution, the droplets produced are already in relatively homogeneous distribution over the reactor cross section and hence also mixed with the drying gas. Nevertheless, in general, variations in the droplet concentration and in the gas temperature arise locally over the reactor cross section, and these lead to incomplete exploitation of the drying gas. Exploitation of the drying gas is understood here to mean the absorption of water in and release of heat from the gas, with establishment of a substantially homogeneous temperature and a substantially homogeneous water concentration in the gas over the reactor cross section in each case in the event of complete exploitation of the drying gas. In the event of incomplete exploitation of the drying gas, by contrast, the temperature distribution and water concentration are not homogeneous over the reactor cross section. In order to minimize this effect, a defined flow turbulence is generated in the gas phase, which increases the homogeneity of the distribution of the droplets over the reactor cross section and hence ensures better mixing of the drying gas with the droplets of the monomer solution. The flow turbulence must not be too small because the homogenizing effect is otherwise negligible, nor too great, because droplets or particles can otherwise arrive too quickly at the reactor wall and lead to formation of deposits there.

An apparatus for increasing turbulence used may be any apparatus with which the turbulence of the gas flow can be increased. Examples of apparatuses used for increasing turbulence may be baffles disposed above or below the apparatus for dropletization. Alternatively, it is also possible to use gas nozzles, gas/liquid nozzles or liquid nozzles for increasing turbulence.

When baffles are used, the flow around the baffles results in vortexing of the drying gas and in an increase in the turbulence in this manner. In order to prevent the monomer solution leaving the apparatus for dropletization from leading to formation of deposits on the baffles by virtue of the vortexing generated, the baffles are preferably positioned such that, when disposed beneath the apparatus for dropletization, they are always offset between the individual dropletizer units of the apparatus for dropletization in a theoretical vertical projection and are not hit directly by the jets of droplets formed in the dropletizer units. It is possible to adjust the degree of flow turbulence via the number and size of the baffles. Suitable baffles are, for example, plates of any desired shape that are arranged perpendicularly or substantially perpendicularly to the vertical, for example round, rectangular or polygonal plates, or any other bodies that bring about significant curtailment of the flow and hence generation of flow turbulence. In addition, the baffles used may also be perforated plates, or the dropletizer units may be modified in terms of their geometry such that an additional increase in turbulence is effected thereby.

Alternatively, the baffles may also comprise a perforated plate having holes having a hydraulic diameter of 5 to 200 cm, preferably of 10 to 100 cm. The holes may be of any desired shape, i.e., for example, circular, polygonal or elliptical. The holes are preferably circular. The size of the holes in the perforated plate prevents—in contrast to the case of very fine free jets that exit from small holes having a diameter of a few millimeters as formed in standard perforated plates—immediate dissipation of the flow turbulence induced as a result of friction. The turbulence thus generated leads, as in the case of the baffles, to homogenization of the gas phase temperature and of the particle concentration. Since the perforated plate must necessarily be disposed above the apparatus for dropletization because the droplets of monomer solution will otherwise hit the perforated plate and thus lead to deposits, there is already an increased level of turbulence at the level of the dropletizer units, which can lead to collisions of jets of droplets with one another and hence to coalescence. This can lead to an undesirably broad droplet size distribution.

The addition point for gas may have one or more perforated plates, for example, and is typically designed such that sufficient equal distribution of the drying gas flowing into the reactor is achieved. As a reference for possible executions, reference is made to technical literature such as Keith Masters, "Spray Drying Handbook", 5th edition (1991), or else WO-A 91/04776.

When the addition point for gas is configured such that elevated turbulence is generated, it is possible, for example, to configure at least one perforated plate, especially the last perforated plate in flow direction of the gas, as described above for the baffles, namely such that it has holes having a hydraulic diameter in the range from 5 to 200 cm, preferably from 10 to 100 cm, where these may be of any desired shape. Alternatively, the addition point for gas may also comprise one or more gas nozzles which generate flow turbulence.

Elevated turbulence in the context of the present invention means that the local turbulence of the gas flow in the region of the dropletizer units or below the dropletizer units is greater than the mean turbulence that the incoming gas would have on the basis of the mean gas velocity in the reactor alone.

Dropletizer units are understood in the context of the present invention to mean the parts of the apparatus for dropletization in which the droplets are generated. Dropletizer units used may thus, for example, be spray nozzles. It is preferable, however, when the dropletizer units each comprise a dropletizer channel having holes on its underside through which the monomer solution is dropletized. The holes are more preferably formed in perforated plates that form the underside of the dropletizer channel. One possible configuration of the reactor and possible forms of the apparatus for dropletization are shown by way of example in WO-A 2015/197359.

Alternatively or additionally, preferably alternatively, nozzles can also be used for increasing turbulence. For this purpose, the apparatus for increasing turbulence comprises gas nozzles, gas/liquid nozzles or liquid nozzles. When the nozzles used for increasing turbulence are gas/liquid nozzles or liquid nozzles, in one embodiment, these are part of the apparatus for dropletization of the monomer solution. For this purpose, elevated turbulence can be achieved, for example, by increasing the entry momentum of the jets of droplets of the dropletizer units or by using spray nozzles to generate the droplets. However, both can likewise lead to an undesirably broad droplet size distribution. The use of spray nozzles or the increase in the velocity of the jet of droplets also harbors the risk that droplets will reach the reactor wall prematurely, resulting in formation of deposits.

The nozzles used for increasing the turbulence are more preferably gas nozzles. Depending on the nozzle diameter and gas exit velocity, gas nozzles induce turbulence downstream in the free nozzle jet. By altering the gas throughput, it is possible in a simple manner to adjust the turbulence level and hence the homogenization of droplet concentration and gas phase temperature. Like the baffles too, the nozzles may be positioned at the level of the dropletizer units or slightly below or above the dropletizer units. In a vertical projection, the nozzles are preferably likewise offset between the dropletizer units, in order to prevent jets of droplets from hitting the nozzles and leading to rapid formation of deposits on the nozzles.

The turbulence induced by the nozzles is determined essentially by the momentum flow rate $I_D$ introduced by the nozzles. The momentum flow rate is the product of mass flow rate and gas velocity of the free jet at the exit of the nozzles:

$$I_D = \dot{m}_D \cdot v_D$$

$I_D$: Total momentum flow rate of all turbulence-generating nozzles [kg*m/s²]

$\dot{m}_D$: Mass flow rate of all turbulence-generating nozzles [kg/s]

$v_D$: Mean flow velocity of the free jet at the nozzle exit [m/s]

Crucial parameters for the effect that the nozzles have on the flow turbulence are the ratio $r_{TG} = I_D/I_{TG}$ of the momentum flow rate which is introduced by the nozzles to the momentum flow rate of the drying gas stream in the reactor and the ratio $r_v = I_D/I_V$ of the momentum flow rate which is introduced by the nozzles to the momentum flow rate of the monomer solution fed in by the apparatus for dropletization.

The momentum flow rate of the drying gas is $$I_{TG}=\dot{m}_{TG}=v_{TG}.$$

$I_{TG}$: Momentum flow rate of the drying gas [kg*m/s$^2$]

$\dot{m}_{TG}$: Mass flow rate of the drying gas [kg/s]

$v_{TG}$: Mean flow velocity of the drying gas in the part of the reactor with constant hydraulic diameter [m/s]

The momentum flow rate introduced by the dropletizer units is $$I_V=\dot{m}_V \cdot v_V.$$

$I_V$: Momentum flow rate which is introduced by all dropletizer units [kg*m/s$^2$]

$\dot{m}_V$: Total mass flow rate of the monomer solution introduced via the dropletizers [kg/s]

$v_V$: Mean flow velocity of the monomer solution at the dropletizer exit [m/s]

In order to achieve a sufficient but not too great an effect of the nozzles on the flow turbulence, the ratio $r_{TG}$ is preferably in the range from 0.1 to 50, more preferably in the range from 0.2 to 20 and especially preferably in the range from 0.5 to 10. The ratio $r_V$ is likewise preferably in the range from 0.1 to 100, more preferably in the range from 0.2 to 50 and especially preferably in the range from 0.5 to 20.

The desired momentum $I_D$ of the turbulence-generating nozzles can be adjusted either via the mass flow rate or via the nozzle exit velocity. In the case of very high exit velocities, for example of several times the speed of sound, the locally generated turbulence is very high, but this is on a very small scale and is immediately dissipated as a result of friction, and so there is no advantage in choosing particularly high exit velocities. On the contrary, very high exit velocities lead to high noise nuisance and to a higher power required to generate the nozzle flow. The nozzle exit velocity is therefore preferably chosen within a range between 5 and 1000 m/s, more preferably between 10 and 500 m/s and more preferably between 20 and 300 m/s. Given a chosen velocity, the desired momentum flow rate is then used to calculate the required mass flow rate. This ultimately gives rise to the nozzle cross section required.

The shape of the nozzle cross section is of minor significance. Round, slot-like or elliptical nozzles or possibly even nozzles having several orifices may be used.

Depending on the size of the reactor for droplet polymerization, one or more turbulence-generating nozzles are used to achieve the total momentum. Since it is desirable that the turbulence is generated homogeneously over the reactor cross section, it is advantageous also to use more nozzles with increasing reactor size. The cross-sectional reactor area per turbulence-generating nozzle in the area of the reactor having constant hydraulic diameter is preferably between 0.5 and 50 m$^2$, preferably between 1 and 25 m$^2$ and more preferably between 2 and 10 m$^2$. This means that the number of gas nozzles, gas/liquid nozzles or liquid nozzles, especially gas nozzles, used for increasing turbulence is in the range from 0.02 to 2 per square meter of cross-sectional reactor area, more preferably 0.04 to 1 and especially 0.1 to 0.5.

When the reactor for droplet polymerization comprises a middle region with constant hydraulic diameter, a conically shaped reactor head with hydraulic diameter increasing in the downward direction and a lower region which is likewise of conical structure, where the hydraulic diameter here decreases from the top downward, and the apparatus for dropletization and the apparatus for increasing turbulence are disposed in the reactor head, the aforementioned parameters are based on the cross-sectional reactor area in the middle region having constant hydraulic diameter.

When the apparatus for increasing turbulence is disposed in the region of the apparatus for dropletization of the monomer solution, the apparatus for increasing turbulence is preferably disposed in a region between 2 m above and 2 m below the apparatus for dropletization. The apparatus for increasing turbulence is preferably disposed 1 m above to 1 m below the apparatus for dropletization. When the apparatus for dropletization comprises dropletizer units at different levels, the level of the apparatus for dropletization utilized, which is used to determine the separation of the apparatus for increasing turbulence, is the middle plane in which the dropletizer units are disposed.

When the apparatus for increasing turbulence is disposed in the region of the addition point for gas, the apparatus for increasing turbulence is disposed up to 2 m below the addition point for gas and more preferably within a region between 10 cm and 1 m below the addition point for gas.

The apparatuses for increasing turbulence, i.e. the gas nozzles, gas/liquid nozzles or liquid nozzles or the baffles, may be disposed at different levels. This is advantageous especially when the dropletizer units are arranged at different levels or when mounting-related reasons necessitate a different level.

Alternatively, it is also possible for all baffles, gas nozzles, gas/liquid nozzles or liquid nozzles of the apparatus for increasing turbulence to be disposed at one level in the reactor. This is advantageous especially when the dropletizer units are likewise disposed at one level.

In the case of use of nozzles, i.e. gas nozzles, gas/liquid nozzles or liquid nozzles, especially in the case of use of gas nozzles, as the apparatus for increasing turbulence, the nozzles may be oriented vertically downward or vertically upward; other orientations are conceivable. For example, there may be a slight inclination in the nozzles in the direction of the reactor axis or else to the outside. It is likewise possible for the nozzles also to have a partly tangential orientation. What should always be noted, however, is that—as in the case, for example, of a tangential orientation—there is the risk that particles will be entrained by the nozzle flow, reach the reactor wall prematurely and lead to formation of deposits. It is particularly preferred when the nozzles are oriented vertically upward, i.e. that the gas stream exiting the gas nozzles is oriented in opposite direction to the drying gas flow. Such an orientation effects the maximum increase in turbulence.

The distribution of the nozzles used as the apparatus for increasing turbulence over the reactor cross section depends on the arrangement of the dropletizer units. In principle, it is advantageous to distribute the nozzles very substantially homogeneously over the reactor cross section in order to generate maximum homogeneity of flow turbulence. It is also advantageous to offset the nozzles with respect to the horizontal position of the dropletizer units, in order to cause no direct interaction between the nozzle jet and jet of droplets. It is likewise advantageous to arrange the nozzles in a very substantially symmetric manner with respect to the dropletizer units. In the case of a highly asymmetric arrangement, there is the risk that the flow field in the region of the dropletizer unit will be significantly deflected and that the jets of droplets will not only widen out as a result of the induced turbulence of the nozzles but will also be significantly deflected, which can also result in the collision of jets.

In order that enough gas can flow past the apparatus for dropletization of the monomer solution, so that a homogeneous gas velocity in the reactor can be achieved and there is not excessive acceleration and vortexing of the gas as it flows round the apparatus, it is additionally preferable that the ratio of the area covered by the apparatus for dropletization in the reactor relative to the area which is enclosed by the line connecting the outermost holes is less than 50% and is preferably in the range between 3% and 30%.

The apparatus of the invention and the process of the invention are preferably used for preparation of water-absorbing polymers, especially for preparation of poly(meth)acrylates. In the context of the present invention, poly(meth)acrylates are understood to mean polyacrylates, polymethacrylates and any desired mixtures of polyacrylates and polymethacrylates.

Illustrative embodiments of the invention are shown in the figures and are explained in more detail in the following description.

Figure 2:
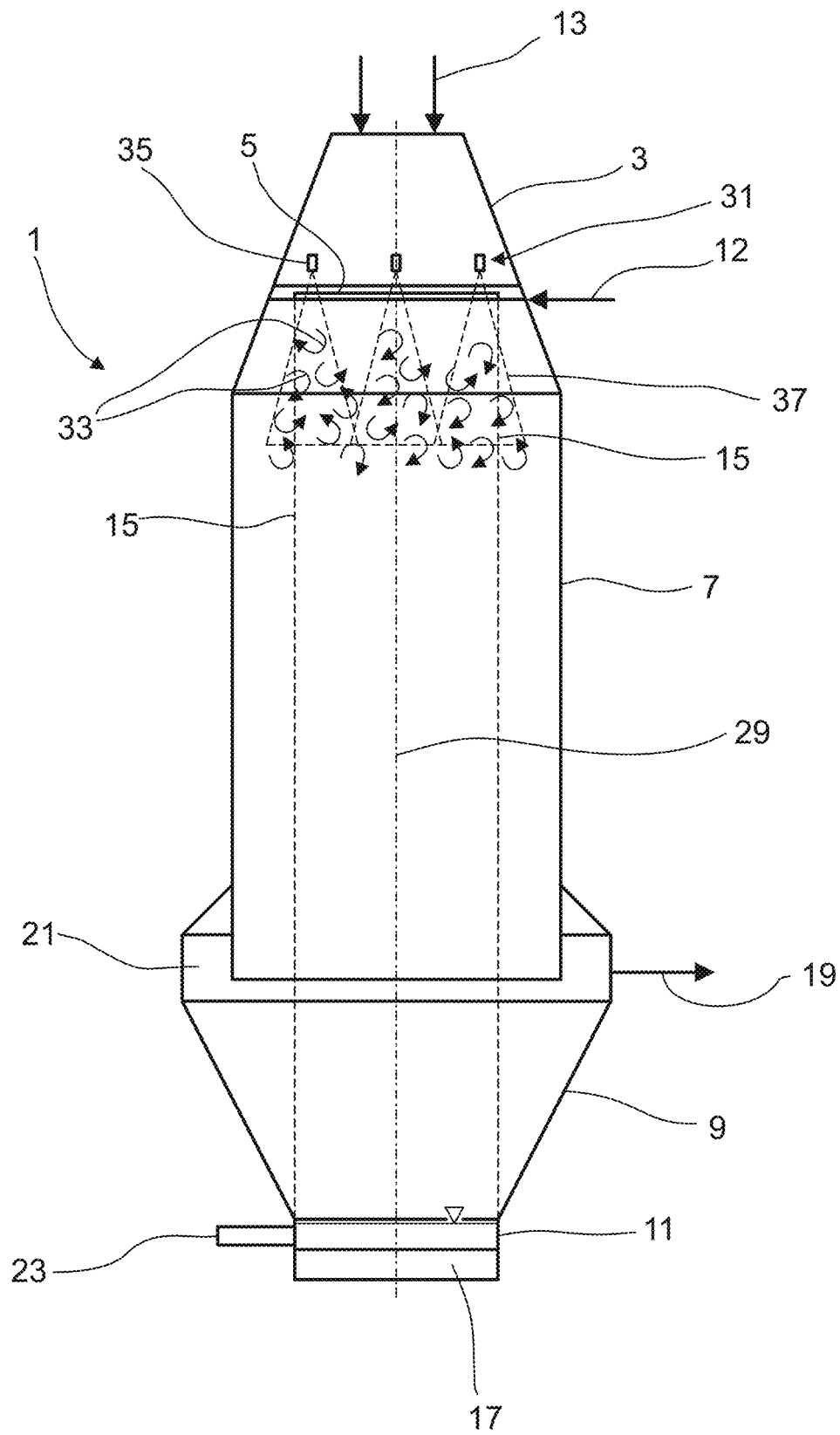
Figure 3:
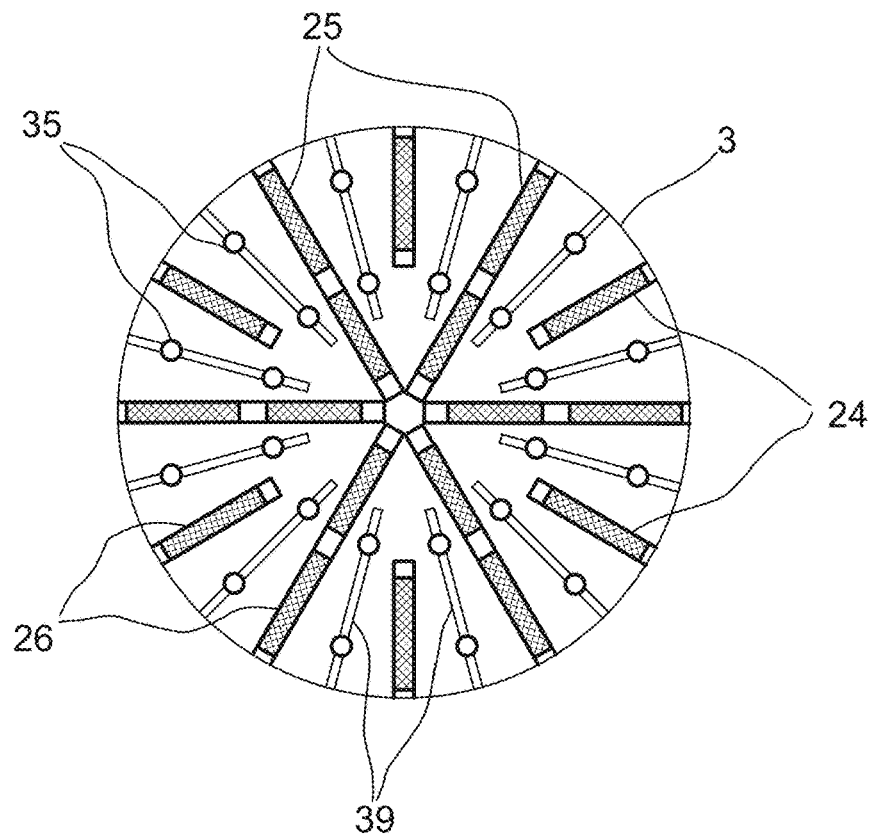
Figure 4:
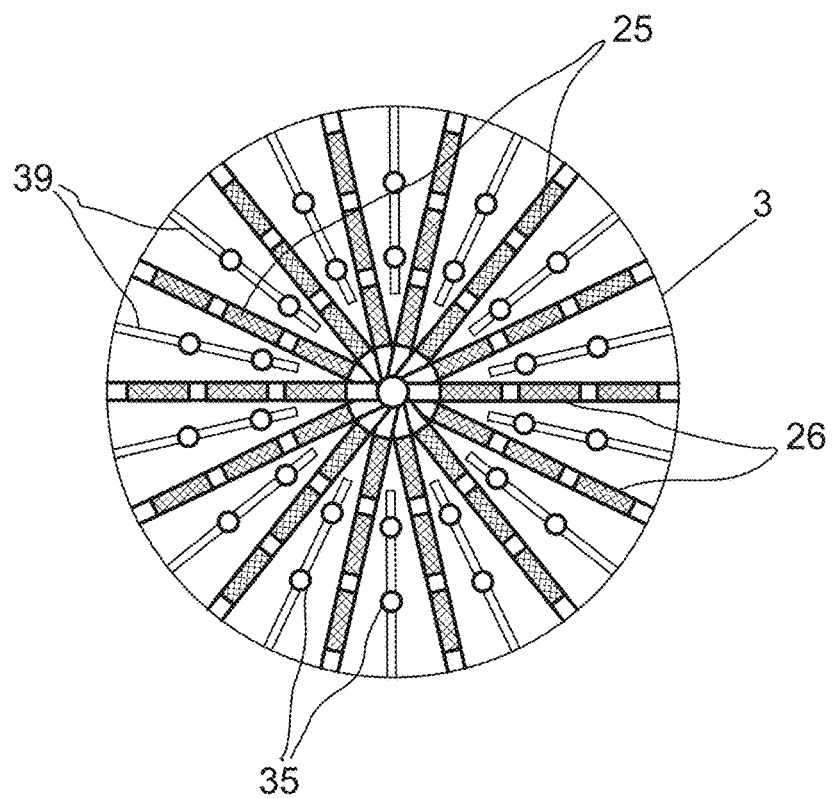
Figure 5:
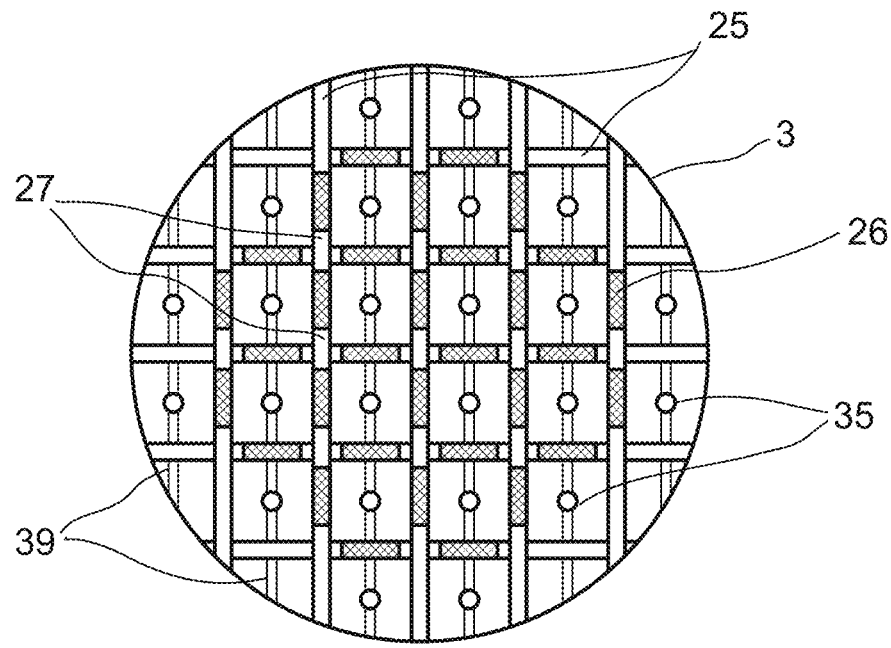
Figure 6:
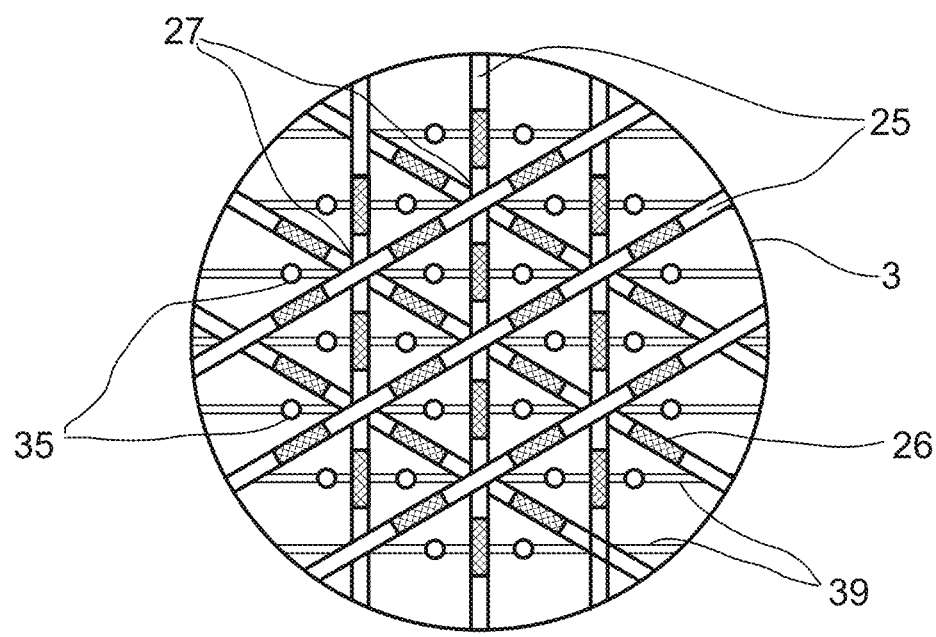
Figure 7:
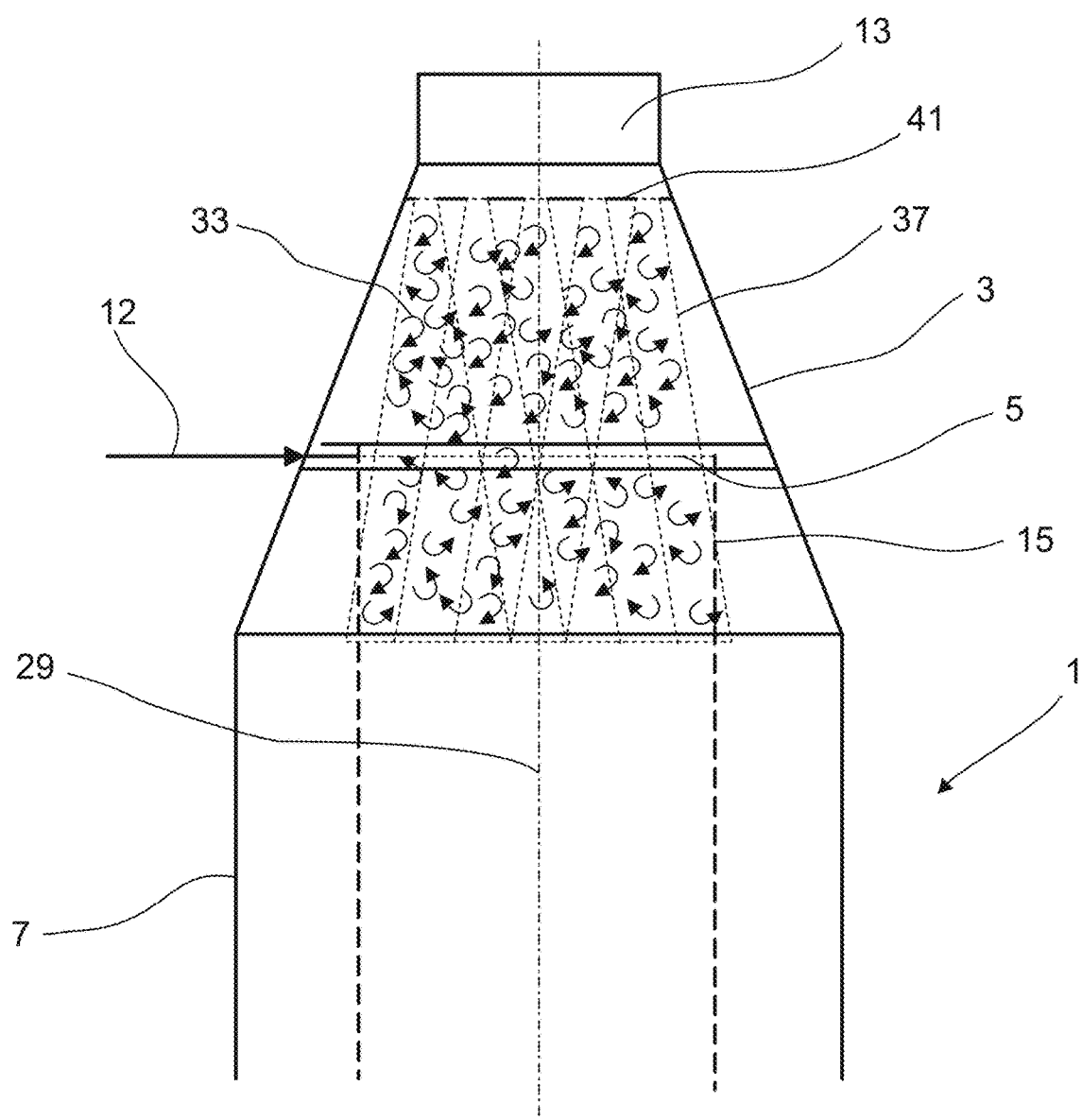
Figure 8:
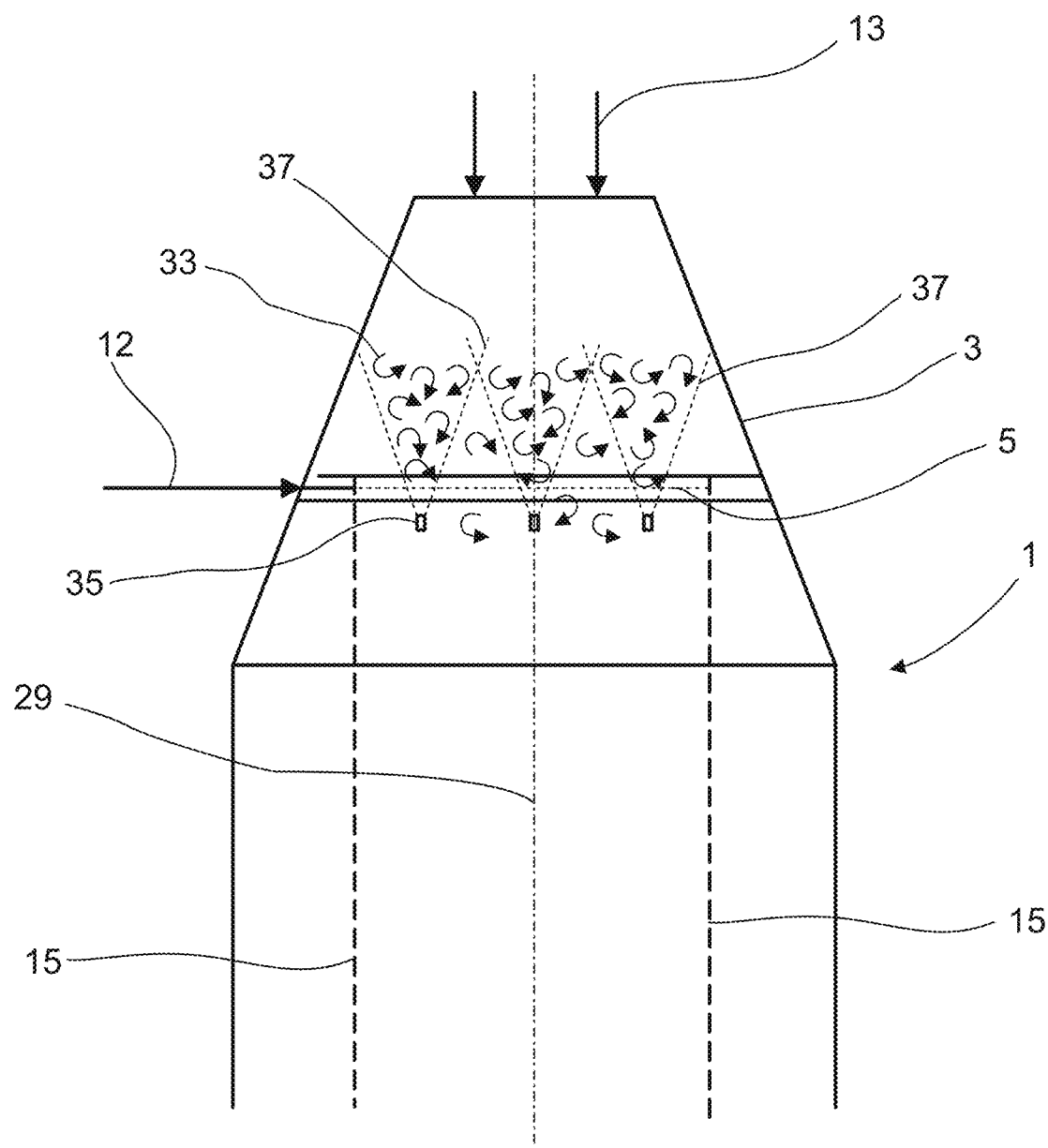
Figure 9:
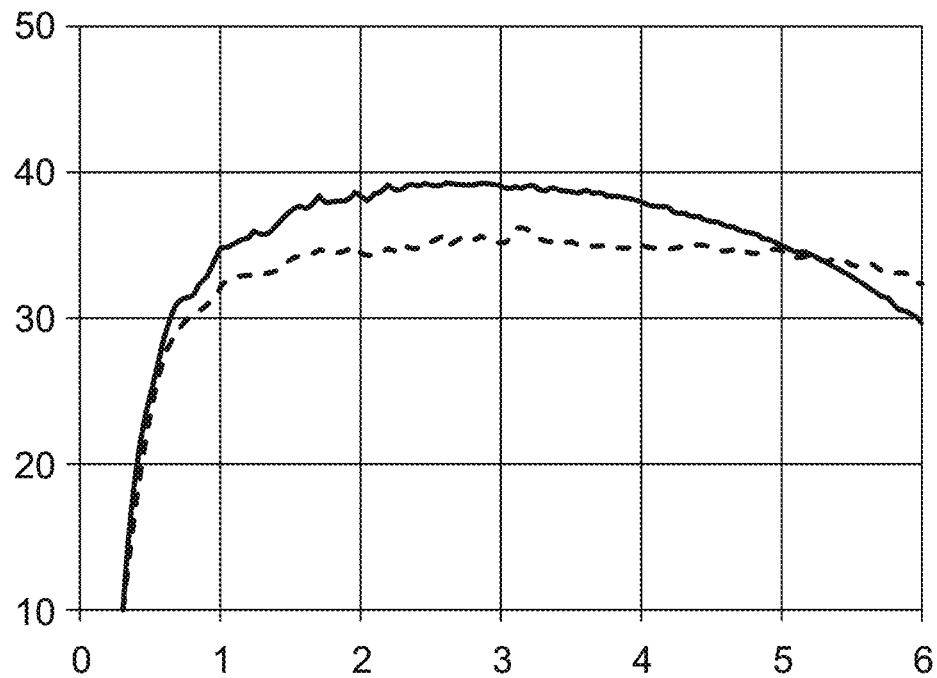
Figure 10:
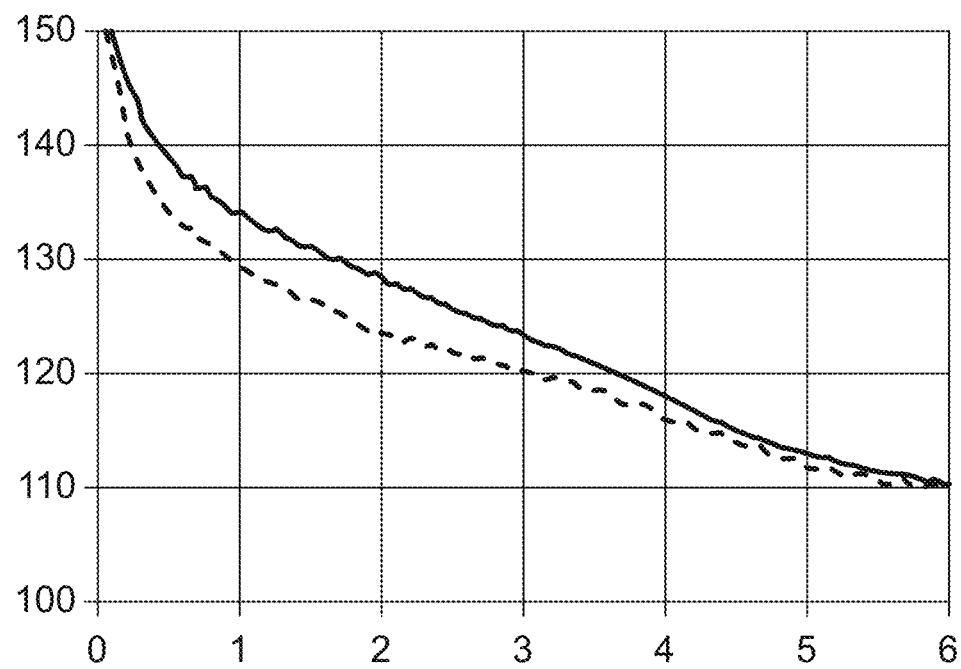

The figures show:

FIG. 1 a longitudinal section through a reactor for droplet polymerization with an apparatus for increasing turbulence beneath the apparatus for dropletization, FIG. 2 a longitudinal section through a reactor for droplet polymerization with an apparatus for increasing turbulence above the apparatus for dropletization, FIG. 3 an arrangement of radial dropletizer channels of different length and apparatuses for increasing turbulence that are arranged between the channels, FIG. 4 an arrangement of dropletizer channels arranged in a star shape and apparatuses for increasing turbulence that are arranged between the channels, FIG. 5 an arrangement of dropletizer channels in rectangular pitch and apparatuses for increasing turbulence that are arranged between the channels, FIG. 6 an arrangement of dropletizer channels in triangular pitch and apparatuses for increasing turbulence that are arranged between the channels, FIG. 7 an upper section of a reactor for droplet polymerization, in which the addition point for gas is configured such that elevated turbulence is generated, FIG. 8 an upper section of a reactor for droplet polymerization having gas nozzles oriented upward as apparatus for increasing turbulence, FIG. 9 a plot of the standard deviation of the particle temperature as a function of the particle dwell time with and without use of an apparatus for increasing turbulence, where the dotted curve represents the case with and the solid curve the case without increasing turbulence, FIG. 10 a plot of the overall temperature as a function of the particle dwell time with and without use of an apparatus for increasing turbulence, where the dotted curve represents the case with and the solid curve the case without increasing turbulence.

FIG. 1 shows a longitudinal section through a reactor for droplet polymerization, as used with preference for production of poly(meth)acrylate particles.

A reactor 1 for droplet polymerization comprises a reactor head 3 in which an apparatus for dropletization 5 is accommodated, a middle region 7 in which the polymerization reaction is performed, and a lower region 9 comprising a fluidized bed 11 in which the reaction is concluded.

The polymerization reaction for producing the poly(meth)acrylate is carried out by supplying the apparatus for dropletization 5 with a monomer solution via a monomer feed 12. When the apparatus for dropletization 5 has two or more channels, it is preferable to supply each channel with the monomer solution via a dedicated monomer feed 12. The monomer solution exits through holes, which are not shown in FIG. 1, in the apparatus for dropletization 5 and disintegrates into individual droplets which fall downward within the reactor. A gas, for example nitrogen or air, is introduced into the reactor 1 via a first addition point for a gas 13 above the apparatus for dropletization 5. This gas flow assists the breakup into individual droplets of the monomer solution exiting from the holes in the apparatus for dropletization 5. In addition, the gas flow promotes lack of contact between the individual droplets and coalescence thereof to form larger droplets.

In order firstly to make the cylindrical middle region 7 of the reactor very short and additionally to avoid droplets hitting the wall of the reactor 1, the reactor head 3 is preferably conical, as shown here, in which case the apparatus for dropletization 5 is within the conical reactor head 3 above the cylindrical region. However, it is also possible as an alternative to provide the reactor with a cylindrical configuration in the reactor head 3 as well, with a diameter the same as that of the middle region 7. However, a conical configuration of the reactor head 3 is preferred. The position of the apparatus for dropletization 5 is selected such that there is still a sufficiently large distance between the outermost holes through which the monomer solution is supplied and the wall of the reactor to prevent the droplets from hitting the wall. For this purpose, the distance should at least be in the range from 50 to 1500 mm, preferably in the range from 100 to 1250 mm and especially in the range from 200 to 750 mm. It will be appreciated that a greater distance from the wall of the reactor is also possible. This has the disadvantage, however, that a greater distance is associated with poorer exploitation of the reactor cross section.

In order still to obtain better exploitation of the gas supplied via the addition point 13, an apparatus for increasing turbulence 31 is used in accordance with the invention in the region of the apparatus for dropletization 5 of the monomer solution. The apparatus for increasing turbulence increases the turbulence of the gas, such that better mixing of gas and droplets generated by the apparatus for dropletization 5 is achieved. In this way, it is possible for the droplets to more homogeneously release water to the gas. In addition, a more homogeneous temperature distribution over the dwell time of the droplets in the reactor is obtained. The turbulence generated by the apparatus for increasing turbulence 31 is shown here by arrows 33.

The apparatuses used for increasing turbulence 31 may, for example, be baffles or nozzles, especially gas nozzles, gas/liquid nozzles or liquid nozzles. In the embodiment shown here, the apparatus utilized for increasing turbulence 31 comprises gas nozzles 35. In the embodiment shown in FIG. 1, these are disposed beneath, preferably a maximum of 2 m beneath, the apparatus for dropletization 5. The gas jet 37 exiting from the gas nozzles 35 accelerates the gas fed in via the addition point for gas 13. At the same time, the gas exiting from the gas nozzles 35 is slowed down, as a result of which the gas jet 37 is deflected and deformed, such that additional turbulence is induced. It should be ensured here that the difference in velocity between the gas added through the addition point for gas 13 and the gas added through the gas nozzles 35 is not too great, in order that the turbulence generated is not dissipated by the friction that occurs.

The lower region 9 is capped off with a fluidized bed 11 and the polymer particles formed from the monomer droplets during the fall, fall into said fluidized bed. The postreaction to afford the desired product is performed in the fluidized bed. According to the invention the outermost holes through which the monomer solution is dropletized are positioned such that a droplet falling vertically downward falls into the fluidized bed 11. This can be achieved, for example, by virtue of the hydraulic diameter of the fluidized bed being at least as large as the hydraulic diameter of the area which is enclosed by a line connecting the outermost holes in the apparatus for dropletization 5, the cross-sectional area of the fluidized bed and the area formed by the line connecting the outermost holes having the same shape and the centers of the two areas being at the same position in a vertical projection of one onto the other. The outermost position of the outer holes relative to the position of the fluidized bed 11 is shown in FIG. 1 using a dotted line 15.

In order, in addition, to prevent droplets from hitting the wall of the reactor in the middle region 7 as well, the hydraulic diameter at the level of the midpoint between the apparatus for dropletization and the gas withdrawal point is at least 10% greater than the hydraulic diameter of the fluidized bed.

The reactor 1 may have any desired cross-sectional shape. However, the cross section of the reactor 1 is preferably circular. In this case, the hydraulic diameter is the same as the diameter of the reactor 1.

Above the fluidized bed 11, the diameter of the reactor 1 increases in the embodiment shown here, such that the reactor 1 widens conically from the bottom upward in the lower region 9. This has the advantage that polymer particles that are formed in the reactor 1 and hit the wall can slide downward along the wall into the fluidized bed 11. To avoid caking, it is additionally possible to provide tappers, not shown here, with which the wall of the reactor is set in vibration, as a result of which adhering polymer particles are detached and slide into the fluidized bed 11.

For gas feeding for the operation of the fluidized bed 11, a gas distributor 17 beneath the fluidized bed 11 blows the gas into the fluidized bed 11.

Since gas is introduced into the reactor 1 both from the top and from the bottom, it is necessary to withdraw gas from the reactor 1 at a suitable position. For this purpose, at least one gas withdrawal point 19 is disposed at the transition from the middle region 7 having a constant cross section to the lower region 9 which widens conically from the bottom upward. Here, the wall of the cylindrical middle region 7 projects into the lower region 9 which widens conically in the upward direction, the diameter of the conical lower region 9 at this position being greater than the diameter of the middle region 7. In this way, an annular chamber 21 which encircles the wall of the middle region 7 is formed, into which the gas flows and can be drawn off through the at least one gas withdrawal point 19 connected to the annular chamber 21.

The further-reacted polymer particles of the fluidized bed 11 are withdrawn via a product withdrawal point 23 in the region of the fluidized bed.

FIG. 2 shows a reactor for droplet polymerization in an alternative embodiment.

By contrast with the reactor for droplet polymerization 1 shown in FIG. 1, the apparatus for increasing turbulence 31 in the reactor 1 shown in FIG. 2 is disposed above the apparatus for dropletization 5 of the monomer solution. In FIG. 2 as well, gas nozzles 35 for increasing turbulence are shown by way of example. The gas jet 37 that exits from the gas nozzles 35 increases the turbulence in the gas flow, and the increase in turbulence in the case of gas nozzles 35 disposed above the apparatus for dropletization 5 sets in at a higher position than in the variant shown in FIG. 1 with gas nozzles 35 beneath the apparatus for dropletization 5. In the adjustment of the turbulence, it therefore has to be ensured that the monomer droplets that leave the apparatus for dropletization 5 do not hit the apparatus for dropletization 5 and thus lead to formation of deposits. Especially in the case of use of gas nozzles 35, it is possible to adjust the turbulence in a simple manner by altering the velocity of the gas leaving the gas nozzles 35.

In order, more particularly, in the case of an apparatus for increasing turbulence 31 disposed beneath the apparatus for dropletization 5, to prevent formation of a deposit on the apparatus for increasing turbulence 31, the individual baffles or nozzles of the apparatus for increasing turbulence 31 are positioned such that they are arranged between the individual dropletizer units of the apparatus for dropletization 5. This is shown by way of example for the use of gas nozzles 35 as the apparatus for increasing turbulence 31 and dropletizer channels 25 as dropletizer units of the apparatus for dropletization 5 in FIGS. 3 to 6.

FIG. 3 shows an arrangement of radial dropletizer channels of different length.

In a first embodiment, the apparatus for dropletization has radial channels 25. In this case, one portion of the channels 25 projects into the middle of the reactor 1. A further portion of the channels 24 projects less far into the reactor 1, and so, especially in the outer regions of the reactor where the distance between the radial channels 25 projecting into the middle of the reactor 1 is high, further channels 24 through which monomer solution can be introduced into the reactor 1 are provided. This allows more homogeneous distribution of the droplets over the total reactor cross section.

The individual gas nozzles 35 which are used for increasing turbulence are positioned between the channels 24, 25. In this case, for homogeneous turbulence and hence a homogeneous gas flow in the reactor, the gas nozzles 25 are distributed homogeneously over the reactor cross section.

A corresponding star-shaped arrangement of the channels 25 is shown in FIG. 4.

Both in the case of the embodiment shown in FIG. 3 and in the case of that shown in FIG. 4, it is possible to align the channels 24, 25 at an angle β to the horizontal. For this purpose, it is especially advantageous when the channels 24, 25 rise toward the middle of the reactor. This alignment affords a more homogeneous distribution of the droplets in the reactor 1 and prevents premature contact of the droplets with the reactor wall.

Further possible arrangements of the channels are shown in FIGS. 5 and 6. In these, however, an arrangement with an angle β to the horizontal can be achieved only with difficulty, such that the channels 25 in this case preferably run horizontally. FIG. 5 shows an arrangement in rectangular pitch, in which the individual channels 25 are each arranged at an angle of 90° to one another, such that the points of intersection 27 of the channels each form rectangles, preferably squares.

FIG. 6 shows an arrangement in triangular pitch. The channels 25 here are each arranged at an angle of 60° relative to one another, such that the points of intersection 27 of the channels 25 each form equilateral triangles. However, this additionally requires the channels that run parallel in each case always to have an equal separation.

Irrespective of the arrangement of the channels 25 that are used as dropletizer units, the baffles or nozzles, for example the gas nozzles 35, are positioned in homogeneous distribution over the reactor cross section between the dropletizer units. In the case of rectangular pitch or triangular pitch, the position of the baffles or nozzles in each case is preferably at the center of the rectangles or triangles formed by the channels 25.

The necessary supply of gas and/or liquid is preferably via conduits 39 which, in the case of an arrangement as shown in FIGS. 3 and 4, run between the channels 24, 25, or, in the case of an arrangement as shown in FIG. 5 or 6, run above the channels 25, in order to prevent droplets generated in the apparatus for dropletization 5 from falling onto the conduits 39 and leading to formation of deposits there.

As an alternative to the embodiments shown here, it is of course also possible to arrange the channels such that the distance between channels arranged in parallel varies, or the distance between the channels arranged in parallel is equal in each case but the distances between the channels that are arranged in parallel and run in different directions are different. In addition, it is also possible to arrange the channels at any other angle relative to one another.

Especially in the case of a circular reactor cross section, however, preference is given to the arrangements shown in FIGS. 3 and 4. In this case, however, the number of channels may vary as a function of the circumference of the reactor. In addition, it is possible to configure the channels with different lengths, as shown in FIG. 3, such that they project into the reactor 1 to different extents. However, a rotationally symmetrical arrangement is always preferred.

The position of dropletizer plates 26 which conclude the channels for supply of the monomer solution at the base thereof, and in which the holes through which the monomer solution is dropletized into the reactor are formed, is shown in FIGS. 3 to 6 by the dotted areas.

According to the invention, the number of channels 24, 25 is selected such that the ratio of the area covered by the channels 24, 25 or the dropletizer head in the reactor relative to the area which is defined by the circumference of a line along the outermost holes is less than 50%. This ensures that sufficient gas can flow past the channels 24, 25 and adequate contact between gas and droplets leaving the channels 24, 25 is achieved.

A further means of generating elevated turbulence in the gas flow is shown in FIG. 7. Here, by contrast with the embodiments in FIGS. 1 to 6, the addition point for gas 13 is configured such that elevated turbulence is generated. For this purpose, the addition point for gas 13 comprises at least one perforated plate 41 through which the gas is guided. The perforated plate has holes having a hydraulic diameter of 5 to 200 cm, preferably of 10 to 100 cm. It is particularly advantageous when two or more perforated plates are arranged one on top of another and at least the last perforated plate in flow direction of the gas, as described above, has holes having a hydraulic diameter of 5 to 200 cm. The perforated plates are preferably arranged such that the holes of the individual perforated plates are not exactly one on top of another. This means that the centers of holes lying one on top of another are not on a vertical axis.

The shape of the holes can be chosen as desired. However, preference is given to circular holes.

In the case of configuration of the addition point for gas 13 such that elevated turbulence is generated, the gas flow already has turbulence 33 above the apparatus for dropletization 5, which leads to a more homogeneous distribution of the droplets generated in the apparatus for dropletization 5 over the reactor cross section. However, the increase in turbulence is to be locally limited and is preferably to be effective only in the region of or beneath the dropletizer units. This ensures the desired improvement in mixing of the drying gas with the monomer solution introduced in droplet form and results in more homogeneous distribution of the droplets over the reactor cross section, without resulting in unwanted effects such as formation of deposits on the reactor wall.

A preferred embodiment of the apparatus for increasing turbulence is shown in FIG. 8.

In difference to the apparatuses for increasing turbulence as shown in FIGS. 1 and 2 with gas nozzles 35 being oriented downward, in FIG. 8 the gas nozzles 35 are oriented vertically upward. Thus, a gas jet 37 exits each gas nozzle 35 which is directed opposite to the flow direction of the drying gas applied via the addition point for gas 13. Due to the gas exiting the gas nozzles 35 in opposite direction to the gas flow of the drying gas turbulence 33 is generated in the region of the apparatus for dropletization 5. As the drying gas is the mean gas stream, the total gas flow is directed downwards and the drying gas flow remains turbulent in direction of flow of the drying gas while streaming past the apparatus for dropletization 5. Due to the orientation of the gas nozzles 35 vertically upward the turbulence is induced further upstream of the apparatus for dropletization 5. As a result the transverse spreading of the turbulence in the drying gas flow down to the apparatus for dropletization 5 is improved and thus can influence the monomer solution exiting the apparatus for dropletization 5 more effectively and more uniformly.

Irrespective of the arrangement of the dropletizer units, the baffles or nozzles of the apparatus for increasing turbulence 31 are always positioned such that no droplets can fall onto the baffles or nozzles. In addition, the baffles or nozzles are arranged in homogeneous distribution over the reactor cross section, in order to obtain a homogeneous gas flow and equal turbulence over the entire reactor cross section, in order that a homogeneous product is formed.

EXAMPLE

The example which follows shows a comparison of the operation of a droplet polymerization reactor with and without generation of turbulence in the gas flow. For the comparison, results which have been determined by computer with the aid of numerical flow simulation have been cited. Two cases are considered in the comparison:

(1) Operation of a reactor for droplet polymerization as shown in FIG. 1 with 16 gas nozzles for increasing the turbulence, with the gas nozzles each distributed homogeneously over the circumference on two theoretical concentric circles having diameters of 3.8 and 5.8 m and in symmetrical arrangement based on the dropletizer channels, and with 8 gas nozzles positioned on each of the concentric circles. For this purpose, 8 dropletizer channels are envisaged, which are arranged in a star shape in accordance with the embodiment shown in FIG. 4. The gas volume flow rate through all nozzles together is 7500 m³ (STP)/h. The nozzles have an orifice diameter of 45 mm. The diameter in the middle portion of the reactor with constant hydraulic diameter is 10.3 m. The diameter of the reactor at the level of the dropletizer units is 7.2 m. The gas volume flow rate which is applied by the addition point for gas 13 is 175 000 m³ (STP)/h.

(2) Operation of the droplet polymerization reactor under the same conditions as in the first case, but without turbulence nozzles and the additional gas stream thus fed in.

FIG. 9 shows, for both cases computed, the plot of the standard deviation of the particle temperature as a function of the particle dwell time, the plot for the first case with gas nozzles for increasing turbulence being shown by a dotted line and the plot for the second case without increasing turbulence by a solid line. For this purpose, the particle dwell time in seconds is shown on the abscissa and the standard deviation on the ordinate. The higher the standard deviation, the less homogeneously the particles are heated. In the dwell time range from 0 to 6 s, the standard deviation in the case of operation with turbulence nozzles is up to 5 K less than in the case without turbulence nozzles. The dwell time of 6 s corresponds to the average time that the particles take to reach the fluidized bed at the lower end of the reactor.

FIG. 10 shows the gas temperature of the gas surrounding the particles along their trajectory as a function of the particle dwell time. Here too, the particle dwell time is shown in seconds on the abscissa. The ordinate shows the temperature of the gas surrounding the particles in ° C. Here too, the first case with gas nozzles for increasing turbulence is shown by a dotted line and the second case without an additional increase in turbulence by a solid line. In the case of operation with gas nozzles for increasing turbulence, the gas temperature drops more quickly, which means that the particles are heated more quickly on average. Both the standard deviation of the particle temperature and the gas temperature of the gas surrounding the particles along their trajectory show that the drying of the particles in operation with gas nozzles for increasing the turbulence proceeds more homogeneously and quickly, the effect of which is that the particles reach the fluidized bed at the lower end of the reactor in a drier state and hence have a lower tendency to agglomerate.

LIST OF REFERENCE SIGNS 1 reactor for droplet polymerization
3 reactor head
5 apparatus for dropletization
7 middle region
9 lower region
11 fluidized bed
12 monomer feed
13 addition point for gas
15 position of the outermost holes in relation to the fluidized bed
17 gas distributor
19 gas withdrawal point
21 annular chamber
23 product withdrawal point
24 channel
25 channel
26 dropletizer plate
27 point of intersection of the channels
29 reactor axis
31 apparatus for increasing turbulence
33 turbulence
35 gas nozzles
37 gas jet
39 conduit
41 perforated plate

The invention claimed is:

1. An apparatus for production of pulverulent polymers, comprising a reactor (1) for droplet polymerization with an apparatus for dropletization (5) of a monomer solution for the preparation of the polymer, said apparatus for dropletization (5) having holes through which the monomer solution is introduced, an addition point (13) for a gas above the apparatus for dropletization (5), at least one gas withdrawal point (19) at the periphery of the reactor (1) and a fluidized bed (11), wherein at least one of the following features is fulfilled:
   an apparatus for increasing turbulence (31) in the gas flow is disposed in the region of the apparatus for dropletization (5) of the monomer solution,
   an apparatus for increasing turbulence in the gas flow is disposed in the region of the addition point (13) for the gas,
   the addition point (13) for gas is configured such that elevated turbulence is generated.

2. The apparatus according to claim 1, wherein the apparatus for increasing turbulence (31) comprises baffles.

3. The apparatus according to claim 2, wherein the baffles comprise a perforated plate having holes having a diameter of 5 to 200 cm.

4. The apparatus according to claim 1, wherein the apparatus for increasing turbulence (31) comprises gas nozzles (35), gas/liquid nozzles or liquid nozzles.

5. The apparatus according to claim 4, wherein the gas/liquid nozzles or liquid nozzles used for increasing turbulence are part of the apparatus for dropletization (5) of the monomer solution.

6. The apparatus according to claim 4, wherein the gas nozzles (35) used for increasing the turbulence are oriented in direction to the addition point (13) for gas so that a gas jet exiting the gas nozzles (35) is oriented in opposite direction to the gas flow from the addition point (13) for gas.

7. The apparatus according to claim 4, wherein the number of gas nozzles (35), gas/liquid nozzles or liquid nozzles used for increasing turbulence is 0.02 to 2 per square meter of cross-sectional reactor area.

8. The apparatus according to claim 1, wherein the apparatus for increasing turbulence (31) is disposed in a region between 2 m above and 2 m below the apparatus for dropletization (5) and/or up to 2 m below the addition point (13) for gas.

9. The apparatus according to claim 1, comprising baffles, gas nozzles (35), gas/liquid nozzles or liquid nozzles for increasing turbulence (31) disposed at different levels in the reactor (1).

10. The apparatus according to claim 1, wherein the addition point (13) for gas comprises at least one perforated plate having holes having a diameter of 5 to 200 cm.

11. A process for producing pulverulent polymers in an apparatus according to claim 1, comprising:

(a) dropletizing a monomer solution in the apparatus for dropletization (5), wherein the monomer droplets produced fall through the reactor (1) and the monomer reacts at least partly to give the polymer, so as to form particles, (b) supplying gas via the addition point (13) for gas above the apparatus for dropletization (5), so as to produce a gas flow from the top downward in the reactor (1), (c) collecting the particles produced in step (a) in the fluidized bed (11), wherein the reaction to give the pulverulent polymer in the individual particles is concluded and there is optionally postcrosslinking in the fluidized bed (11), (d) withdrawing the particles from the fluidized bed (11), wherein there is an increase in flow turbulence in the gas flow in the region of the apparatus for dropletization (5).

12. The process according to claim 11, wherein turbulence is increased using gas nozzles (35) and the ratio of the momentum flow rate of the gas supplied through all gas nozzles (35) to the momentum flow rate of the gas supplied via the addition point (13) for gas is in the range from 0.1 to 50.

13. The process according to claim 11, wherein turbulence is increased using gas/liquid nozzles or liquid nozzles and the ratio of the momentum flow rate which is generated through all nozzles to the momentum flow rate which is generated in the apparatus for dropletization (5) is in the range between 0.1 and 100.

14. The process according to claim 11, wherein turbulence is increased using gas nozzles (35) and the exit velocity of the gas from the gas nozzles (35) is in the range from 5 to 1000 m/s.

15. The process according to claim 14, wherein a gas jet exiting the gas nozzles (35) is oriented in opposite direction to the gas flow in the reactor (1) produced in step (b).

16. The process according to claim 11, wherein the addition point (13) for gas comprises at least one perforated plate having holes having a diameter of 5 to 200 cm, such that the gas exits from the addition point (13) for gas with elevated turbulence.

17. The process according to claim 11, wherein the pulverulent polymer is a poly(meth)acrylate.

* * * * *